(12) United States Patent
White

(10) Patent No.: US 7,028,797 B2
(45) Date of Patent: Apr. 18, 2006

(54) TEAR-OFF DEBRIS GUARD

(76) Inventor: John Cap White, 300 178th Ave., NE., Ham Lake, MN (US) 55304

( * ) Notice: Subject to any disclaimer, the term of this patent is extended or adjusted under 35 U.S.C. 154(b) by 191 days.

(21) Appl. No.: 10/461,102

(22) Filed: Jun. 14, 2003

(65) Prior Publication Data

US 2004/0251066 A1  Dec. 16, 2004

(51) Int. Cl.
 B60K 11/08  (2006.01)
(52) U.S. Cl. .............................. 180/68.1; 160/DIG. 1
(58) Field of Classification Search ............. 180/68.6, 180/68.1; 165/98; 296/91; 160/DIG. 1
 See application file for complete search history.

(56) References Cited

U.S. PATENT DOCUMENTS

| | | | |
|---|---|---|---|
| 1,257,640 A * | 2/1918 | Rothschild | 165/98 |
| 1,295,629 A | 2/1919 | Stewart | |
| 1,453,340 A | 5/1923 | Druar | |
| 1,496,661 A | 6/1924 | Dreier | |
| 1,573,659 A * | 2/1926 | Thompson | 180/68.1 |
| 1,706,447 A | 3/1929 | Goodykoontz | |
| 1,755,370 A | 4/1930 | Smith | |
| 2,067,639 A * | 1/1937 | Lett | 160/89 |
| 2,127,931 A | 8/1938 | Osten | |
| 2,173,338 A | 9/1939 | Morris | |
| 2,198,123 A * | 4/1940 | McCoy | 160/84.06 |
| 2,263,357 A | 11/1941 | Hanson | |
| 2,501,065 A | 3/1950 | Longeway | |
| 2,792,254 A | 5/1957 | Hagglund | |
| 3,344,854 A | 10/1967 | Boyajian | |
| 3,815,700 A | 6/1974 | Mittendorf | |
| 3,831,696 A | 8/1974 | Mittendorf et al. | |
| 4,085,964 A | 4/1978 | Hutto et al. | |
| 4,236,592 A | 12/1980 | Ziegler | |
| 4,523,657 A * | 6/1985 | Kooyumjian | 180/68.1 |
| 4,537,273 A * | 8/1985 | Funabashi | 180/229 |
| 4,621,860 A | 11/1986 | Gerst | |
| 4,750,549 A | 6/1988 | Ziegler et al. | |
| 4,836,598 A | 6/1989 | Mastin | |
| 5,156,662 A | 10/1992 | Downing et al. | |
| 5,490,574 A * | 2/1996 | Ishiizumi et al. | 180/68.1 |
| 5,592,698 A | 1/1997 | Woods | |
| 5,718,283 A | 2/1998 | Naty et al. | |
| 5,809,800 A | 9/1998 | Deal | |
| 6,019,161 A * | 2/2000 | Travis | 165/41 |

(Continued)

FOREIGN PATENT DOCUMENTS

DE  3629880 A1  3/1988

(Continued)

*Primary Examiner*—Christopher P. Ellis
*Assistant Examiner*—Christopher Bottorff
(74) *Attorney, Agent, or Firm*—Michael A. Mochinski

(57) ABSTRACT

A tear-off debris guard for mitigating the passage of debris into an engine compartment of an all-terrain-vehicle having a frontal grill guard integrally equipped with a plurality of vent openings, the tear-off debris guard comprising in combination a protective screen having a geometric configuration proportionally equivalent to the collective area of the vent openings, a frame member fixedly attached to the perimeter of the protective screen for reinforcement during moments of removal, a tear-off tether fixedly connected to an upper portion of the frame member principally serving as a mechanism for handling and removing the tear-off debris guard from the frontal grill guard to maintain continuous air flow into the engine compartment via the vent openings, and a plurality of hook-and-loop fasteners fixedly attached to an inner surface of the frame member to correspondingly engage and mate with those attached to the frontal grill guard.

19 Claims, 7 Drawing Sheets

U.S. PATENT DOCUMENTS

| | | |
|---|---|---|
| 6,068,675 A | 5/2000 | Tsuda et al. |
| 6,131,681 A | 10/2000 | Nelson et al. |
| 6,206,438 B1 * | 3/2001 | Pueyo .................. 293/115 |
| 6,221,120 B1 | 4/2001 | Bennington et al. |

FOREIGN PATENT DOCUMENTS

| | | |
|---|---|---|
| DE | 3916920 A1 | 11/1990 |
| JP | 60219411 | 11/1985 |

* cited by examiner

TEAR-OFF DEBRIS GUARD

FIELD OF THE INVENTION

The present invention relates in general to a tear-off debris guard for use with an all-terrain-vehicle as well as other off-road vehicles comprising a frontal grill guard dedicated for use in protecting an engine compartment. More specifically, the tear-off debris guard is readily fitted to an exterior surface of the off-road vehicle, specifically being placed over the location provided for air flow to vital operating components, and readily removed therefrom upon being loaded with mud, dirt, and debris to maintain continuous air flow to the engine compartment for reliable and predictable engine performance.

BACKGROUND OF THE INVENTION

The advent of all-terrain-vehicles has spawned numerous enthusiasts to engage in racing events in an attempt to fully realize their machine's potential to perform off road. Some of these events comprise of challenging environmental conditions to the likes of mountainous terrain, mud-laden trails, pot holes, moguls, and other adventurous features. In any event of this nature, as well as in any other sporting event, the enthusiast or the athlete is required to beat the clock against other equally qualified participants. To compete adequately at this level, the enthusiast is required to fine tune his or her machine in hopes of meeting its fullest potential, albeit within competitive limits. Some of the enthusiast's efforts may comprise of altering the mechanical components to generate added horsepower or, less extensively, altering the body components in anticipation of increasing its aerodynamics for reduced wind drag. Notwithstanding sufficient effort being made to the likes provided hereinbefore, the enthusiast may be still unable to adequately compete at this level given his or her inexperience, in addition to other deficiencies not necessarily noted herein. A less notable reason may simply involve the element of uncertainty, particularly with regard to the machine's capacity to reliably perform during competitive events unless drastic steps are taken (e.g., complete tear down of functioning components to achieve a level of performance certainty). This approach may not always be feasible given the economic realities and/or time constraints. Therefore, to perform within reason of one's skill level and expectations, every other option must be exercised to its fullest potential, namely one that ensures engine performance during critical operation, particularly during racing events where time is of the essence.

In accordance with the present invention, applicant has appreciably devised a tear-off debris guard which adaptably fits onto the exterior surface of a frontal grill guard often used in protecting vital engine components of all-terrain-vehicles, and readily removed therefrom upon ample accumulation of mud, dirt and debris to maintain continuous air flow to vital operating components of the type dedicated for use in cooling an engine (e.g., radiator).

BRIEF SUMMARY OF THE INVENTION

In order to overcome the numerous drawbacks apparent in the prior art, a tear-off debris guard has been devised for use with an all-terrain-vehicle comprising a frontal grill guard often used in protecting an engine compartment.

It is thus an object of the present invention to provide a low cost, non-complicated tear-off grill debris guard which may be reliably used in sustaining air flow to vital operating components of the type dedicated for use in cooling an engine.

It is another object of the present invention to provide such a tear-off debris guard comprising one or more protective layers for effective control of air flow to the engine compartment during prolong all-terrain-vehicle operation.

It is another object of the present invention to provide such a tear-off debris guard which mitigates the occurrence of damage to engine components substantially caused by debris of larger size, such as stones, rocks, and timbers often encountered during all-terrain-vehicle operation.

It is another object of the present invention to provide such a tear-off debris guard which can be readily attached to a frontal grill guard without altering or reconfiguring existing features of the all-terrain-vehicle, and readily removed therefrom, layer-by-layer, to achieve the noted utility stated herein, most notably during racing events where time is of the essence.

It is yet another object of the present invention to provide such a tear-off debris guard which accomplishes the foregoing and other objects and advantages and which is economical, durable, and fully effective in performing its intended functions.

In accordance with the present invention, a tear-off debris guard has been devised for use with an all-terrain-vehicle comprising a frontal grill guard, the tear-off debris guard comprising, in combination, a protective screen comprising a geometric configuration proportionally equivalent to the collective area of the vent openings, a frame member configurably arranged about the perimeter of the protective screen to principally serve in reinforcing the tear-off debris guard as it is selectively removed from the frontal grill guard by means of a tear-off tether located at one of two upper corners of the frame member, means for fastening the frame member to an exterior surface of the frontal grill guard, and a plurality of screen risers substantially situated at the midsection of the protective screen, specifically being used in multi-layered applications where a second tear-off debris guard is selectively placed below the first tear-off debris guard and attached to the frontal grill guard.

Other objects, features, and advantages of the present invention will become apparent in the following detailed description of the preferred embodiments thereof when read in conjunction with the accompanying drawings in which like reference numerals depict the same parts in the various views.

BRIEF DESCRIPTION OF THE SEVERAL VIEWS OF THE DRAWINGS

A preferred embodiment of the present invention will now be described by way of example with reference to the accompanying drawings, in which.

DETAILED DESCRIPTION OF THE PREFERRED EMBODIMENT

While this invention is susceptible of being embodied in many different forms, the preferred embodiment of the invention is illustrated in the accompanying drawings and described in detail hereinafter with the understanding that the present disclosure is to be considered to exemplify the principles of the present invention and is not intended to limit the invention to the embodiments illustrated and presented herein. The present invention has particular utility as a device for preventing long-term accumulation of mud, dirt, and debris on the frontal areas of an all-terrain-vehicle, substances of which can collectively restrict the passage of air flow to vital operating components dedicated for use in cooling an engine.

Figure 1:
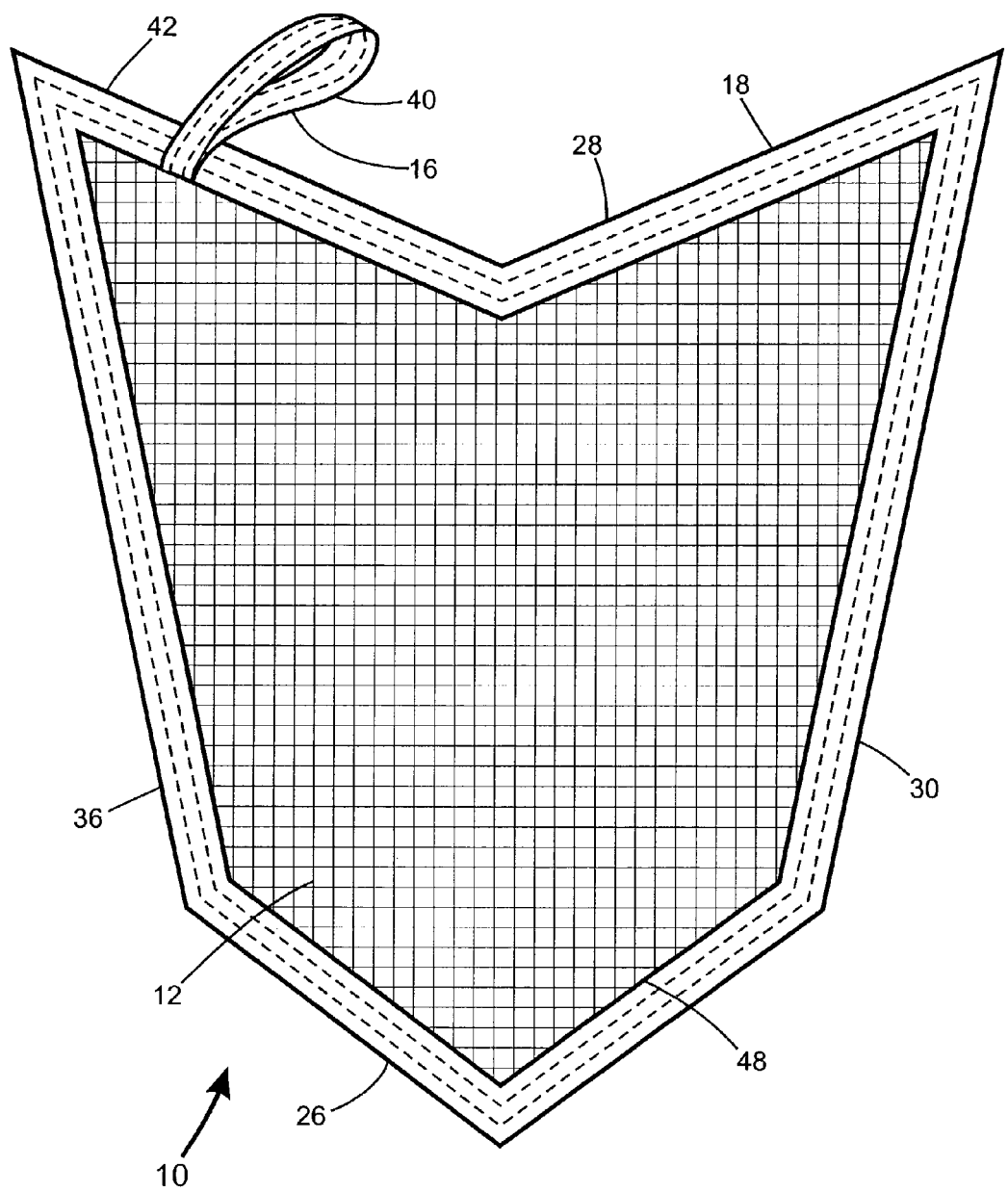
FIG. 1 is a front view of the preferred embodiment of the present invention illustrating a protective screen situated within the geometric confines of a frame member.
Figure 2:
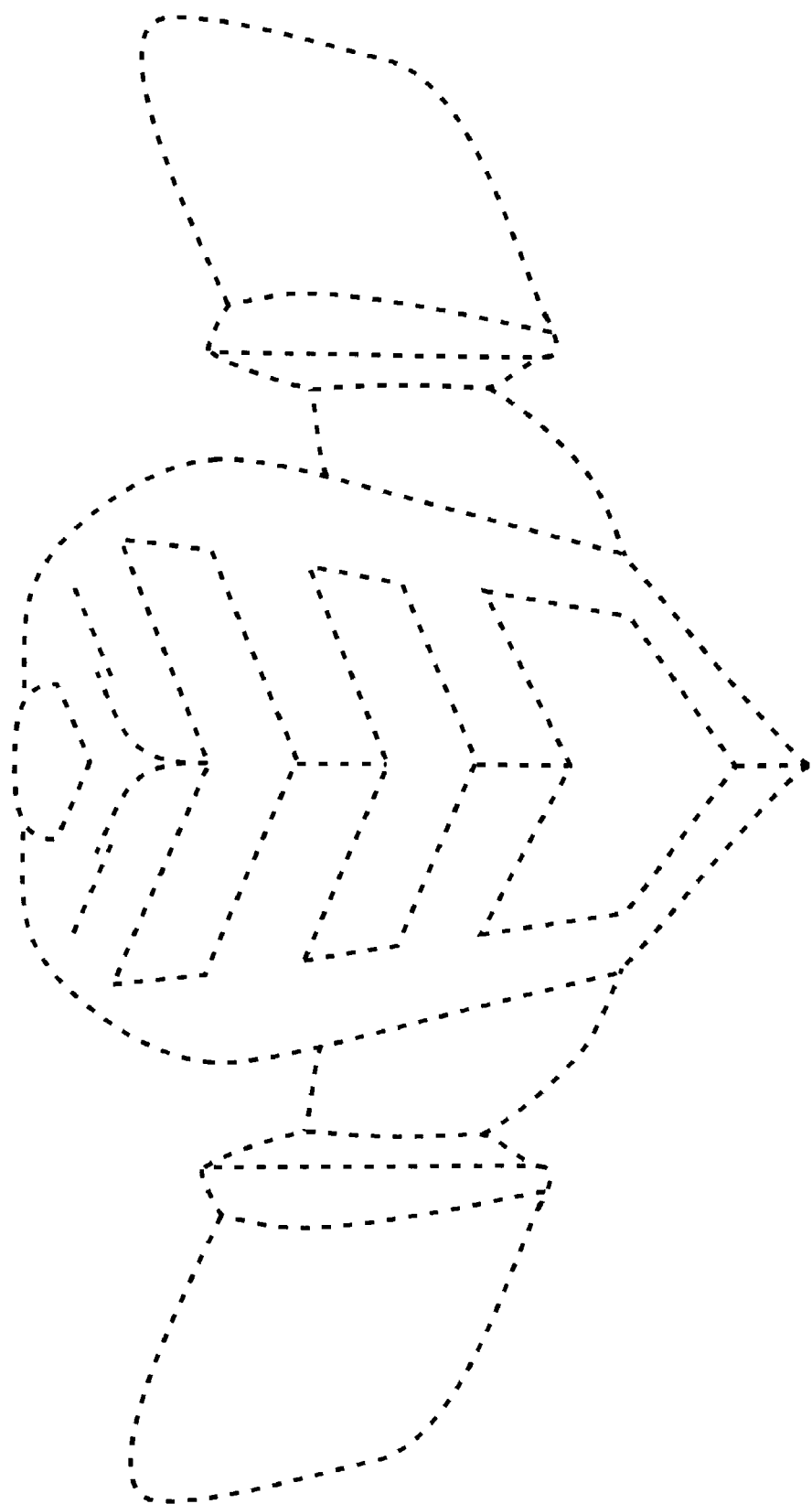
FIG. 2 is front perspective view of the preferred embodiment of the present invention illustrating a frontal grill guard made part of an all-terrain-vehicle.

Referring to FIG. 1, there is shown generally at 10 a tear-off debris guard comprising a protective screen 12 fitted within the confines of a frame member 14 and a tear-off tether 16 fixedly attached to an upper portion 18 of the frame member to effectively serve as means for readily releasing or removing the tear-off debris guard from a frontal grill guard 20 generally made part of an all-terrain-vehicle. It is noted herein that the tear-off debris guard is most suitable for use with a frontal grill guard comprising a plurality of vent openings 22 each effectively serving as a conduit for passage of air into an engine compartment. In some instances, as best illustrated in FIG. 2, the all-terrain-vehicle may comprise a frontal grill guard integrally connected to and situated in between a pair of wheel fenders 24 each effectively serving as means for mitigating the propulsion of debris and the like toward an operator of the all-terrain-vehicle.

In the preferred embodiment, the protective screen 12 is geometrically sized to correspond to the geometric features of the frontal grill guard 20, namely one having a tapered end 26 and a widened v-shaped end 28 opposite thereof, most resembling a badge or shield to the likes shown in FIG. 1. In other words, the protective screen will be sized accordingly to fully cover the collective area of the vent openings 22 to the extent of maintaining continuous air flow into the engine compartment, yet correspond to the geometric limitations or outer boundaries of the frontal grill guard. In other embodiments not necessarily described in detail and shown herein, the protective screen may comprise an overall geometric configuration quite different to that resembling a badge or shield given the variety of design configurations that may be adopted for the frontal grill guard 20 (e.g., geometric configurations comprising an oval, square, circle, etc.). Regardless of the geometric sizing noted above, the protective screen 12 is generally of the type commonly known and used in the art for window screening installations, preferably being fabricated from a material having flexible, pliable characteristics and non-corrosive bearing properties such as aluminum, brass, or plastic. Equally important in maintaining continuous air flow into the engine compartment is the mesh of the protective screen, which preferably ranges from approximately 8 to 18, based on a numeric scale as standardized and recognized in the art where the numeric rating corresponds to the number of holes per linear inch. The use of mesh in this applicable range permits adequate air flow into the engine compartment without undue restriction, while effectively mitigating the passage of most particulate matter during all-terrain-vehicle operation. In some instances of its use, the tear-off debris guard 10 may comprise one or more in number depending on the environmental conditions and duration of its use to maintain unobstructed air flow into the engine compartment. In multi-layered applications, each tear-off debris guard may incorporate the use of a protective screen comprising a mesh of approximately 12, which effectively reduces the passage of most debris into the engine compartment to the likes of a single layered application utilizing a smaller mesh of approximately 18.

Referring now to FIG. 1, the frame member 14 preferably comprises an elongate, strip member 30 placed about and alongside the entire length or perimeter of the protective screen. The frame member principally serves as means for reinforcing the protective screen 12 during events where it is torn away or readily removed from the frontal grill guard 20. In preferred applications, the frame member is constructed from vinyl or an equivalent material bearing weather- and degradation-resisting properties and pliability to tighteningly conform to the geometric contours of the frontal grill guard. In the preferred embodiment, the frame member 14 is substantially formed by placing the elongate strip member alongside the perimeter of the protective screen and folding at its longitudinal midsection until the leading edges 32 thereof correspondingly meet to define inner and outer surfaces 34, 36 which collectively encompass the protective screen's perimeter. Stationary positioning of the frame member is substantially established by sewing along the entire length thereof, through the protective screen's perimeter situated in between the inner and outer surfaces, as best illustrated in FIG. 1.

Figure 3:
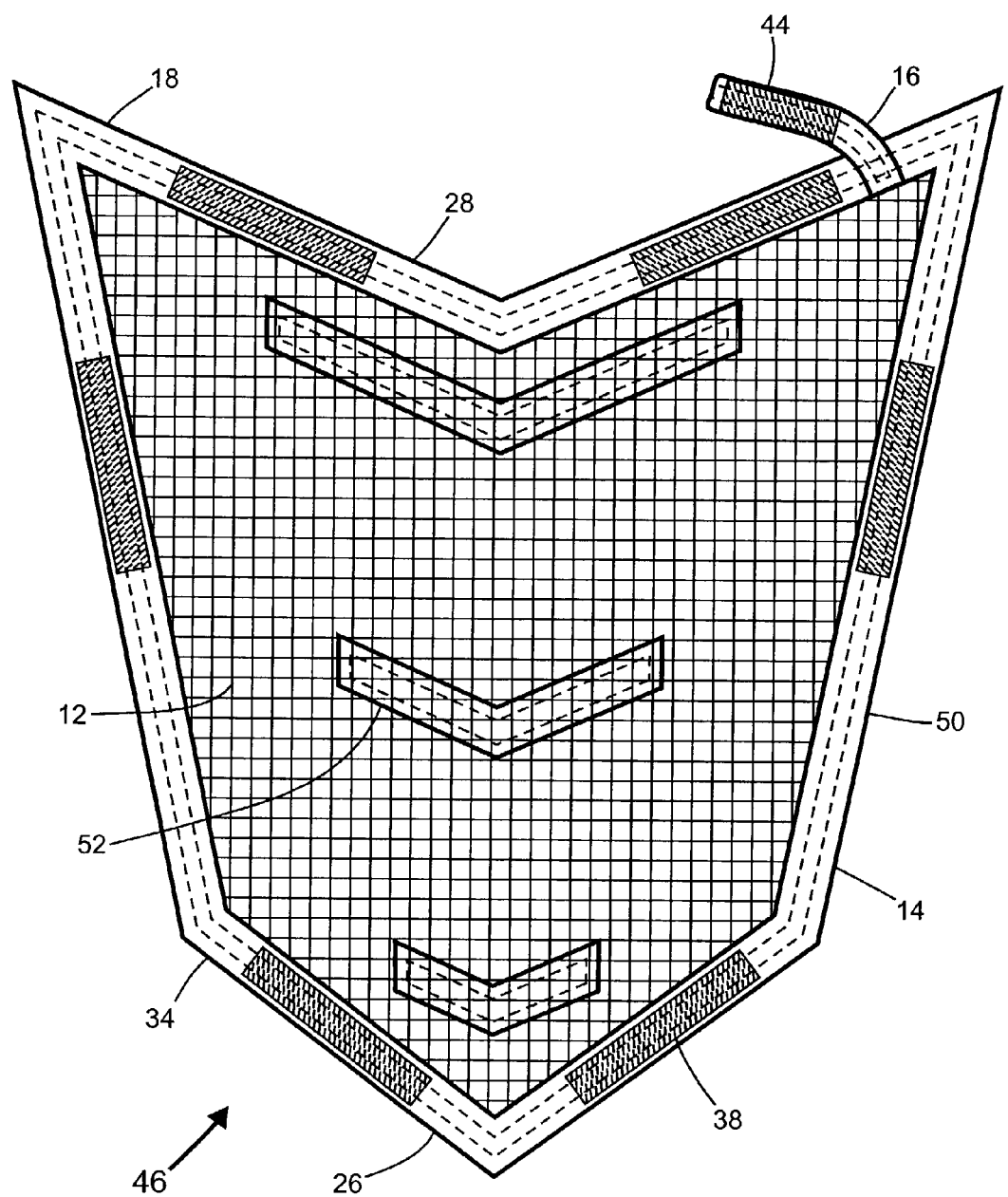
FIG. 3 is back view of the preferred embodiment of the present invention illustrating a plurality of releasable hook-and-loop fasteners fixedly attached to a frame member.

Attachment of the tear-off debris guard to the all-terrain-vehicle is principally established by a plurality of releasable hook-and-loop fasteners 38 fixedly attached to the frame member 14 and the exterior surface of the frontal grill guard 20. Preferably, elongate sections of Velcro or equivalent are placed onto the inner surface 34 of the frame member, with each of the sections being spaced apart a predetermined distance to provide for greater ease in removing the tear-off debris guard 10 from the frontal grill guard through means of the tear-off tether 16, as shown in FIG. 3. A corresponding number of Velcro sections are selectively attached to the frontal grill guard to meet and engage with those fastened to the frame member 14 to allow for final positioning of the tear-off debris guard.

Similar to the material used to construct the frame member, the tear-off tether 16 is fabricated from vinyl or equivalent and is suitably placed within reasonable reach of the operator, namely near the upper portion 18 of the frame member. Preferably, the tear-off tether comprises a loop structure 40 for ease in handling and is placed at and tied into one of two upper corners 42 of the frame member. This positioning allows the operator to readily peal away the tear-off debris guard 10 from the frontal grill guard 20 without substantial effort, particularly from the operator's vantage point while situated on the all-terrain vehicle. To prevent inadvertent movement of the tear-off tether insofar to allow for more predictable handling during all-terrain vehicle operation, the tear-off tether comprises a hook-andloop fastener 44 fixedly attached to the backside thereof and correspondingly to a predetermined area on the frontal grill guard.

Figure 4:
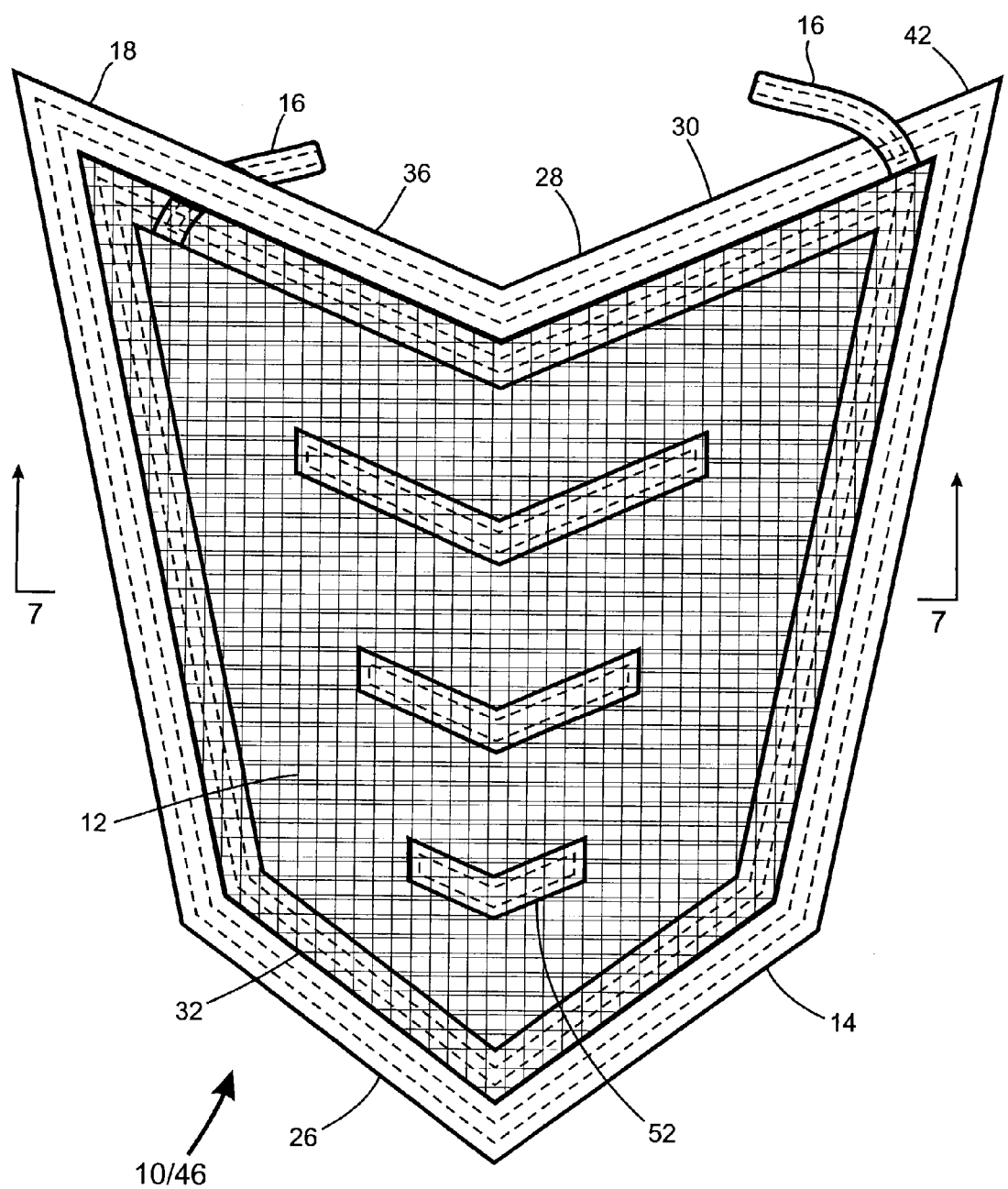
FIG. 4 is a front view of the preferred embodiment of the present invention illustrating the relative positioning of first and second tear-off debris guards.
Figure 5:
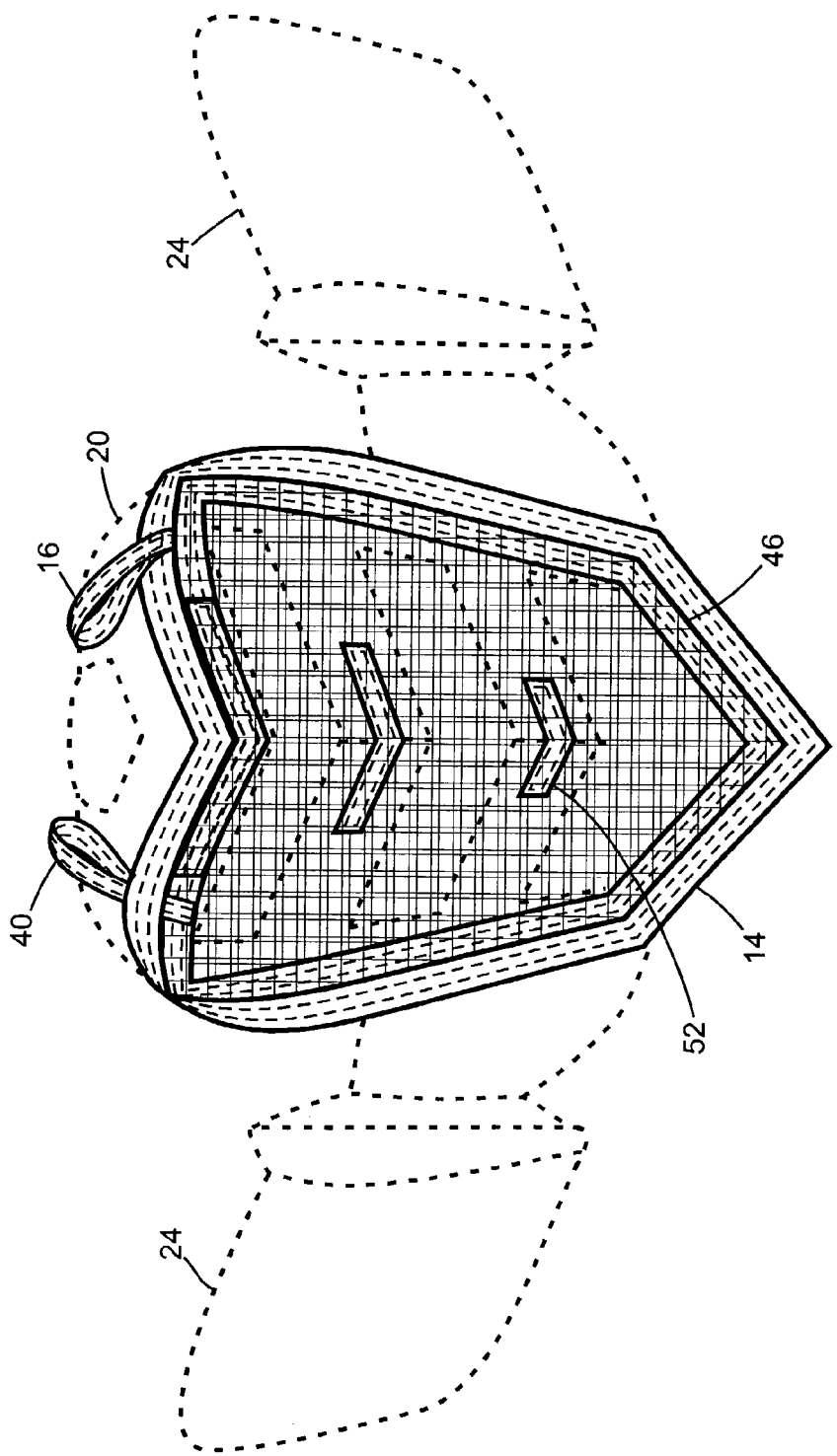
FIG. 5 is front perspective view of the preferred embodiment of the present invention illustrating attachment to a frontal grill guard situated in between a pair of wheel fenders made part of an all-terrain-vehicle.

As noted hereinbefore, a multi-layered application may be utilized to the extent of maintaining adequate air flow into the engine compartment, particularly during prolong all-terrain-vehicle operation in harsh climatic and environmental conditions. In such an instance, as shown in FIG. 4, a second tear-off debris guard 46 comprising a protective screen fitted with a frame member of smaller proportions is configurably arranged to fit within the geometric limitations of the first tear-off debris guard 10. In this multi-layered arrangement, as illustrated in FIG. 5, frame members of both the first and second tear-off debris guards are simultaneously attached to the frontal grill guard with hook-and-loop fasteners previously suggested for use herein and arranged in such a manner that an inner leading edge 48 of the first frame member adaptably abuts against an outer leading edge 50 of the second frame member. In furthering the need to maintain adequate air flows into the engine compartment, each tear-off debris guard selectively comprises a mesh of approximately 12 and geometrically sized to allow unobstructed air flow into the collective area of the vent openings 22.

Figure 6:
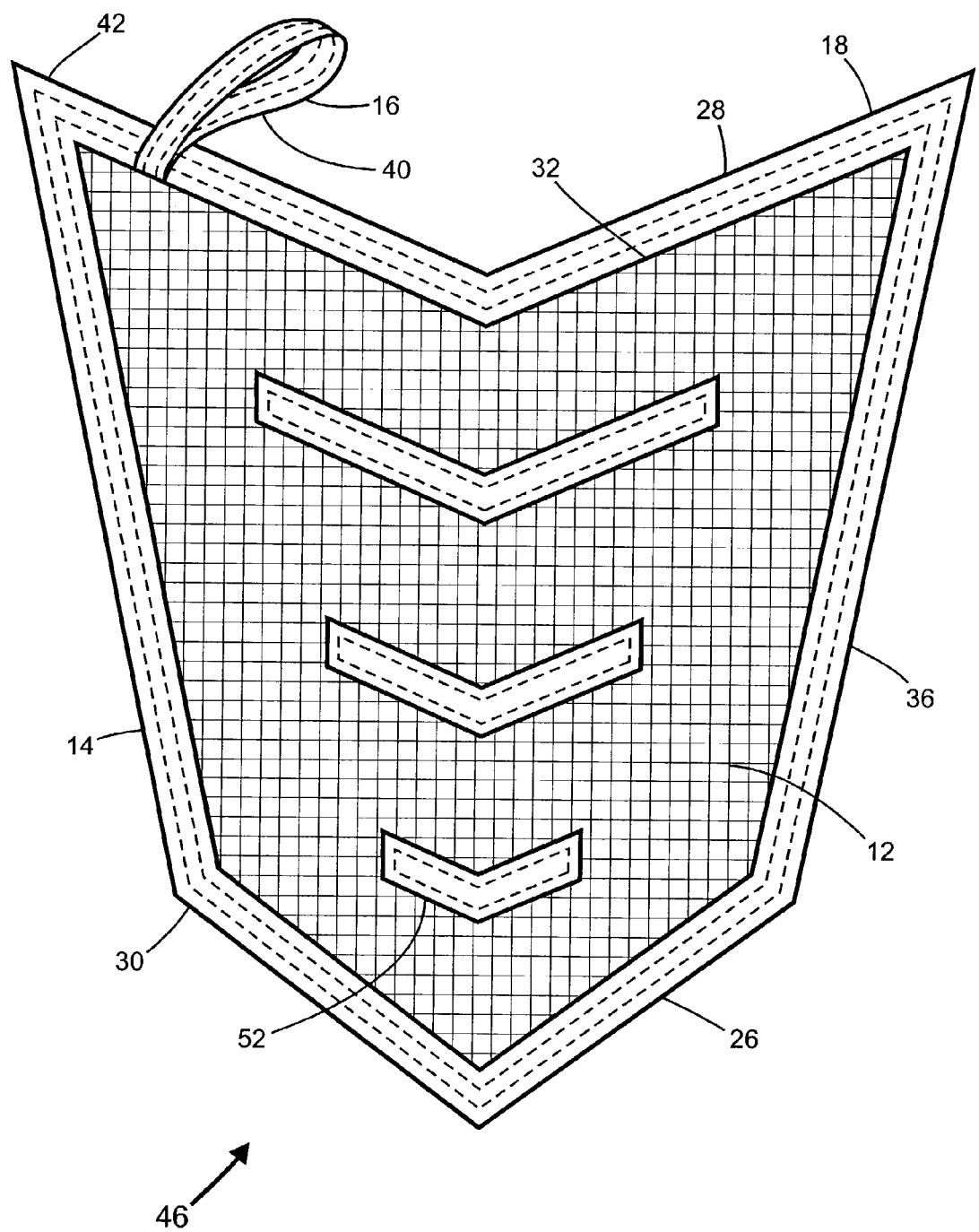
FIG. 6 is a front view of the preferred embodiment of the present invention illustrating a plurality of screen risers fixedly attached to a protective screen.
Figure 7:
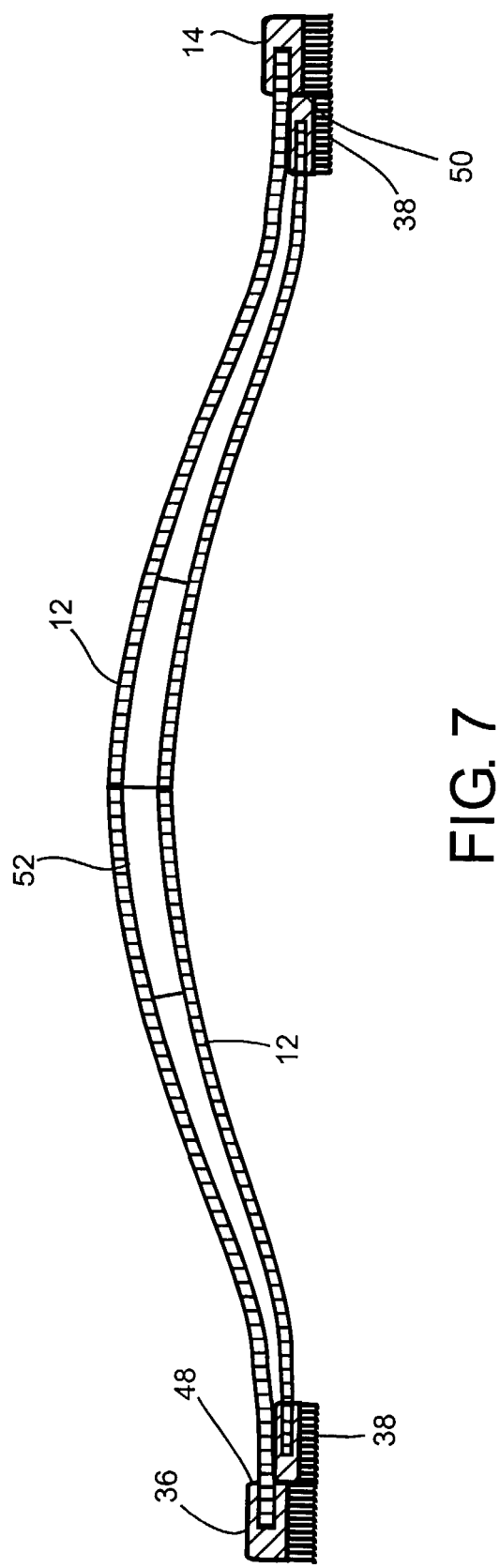
FIG. 7 is a cross sectional view of the preferred embodiment of the present invention taken on line 7—7 of FIG. 4 illustrating a screen riser situated in between first and second protective screens.

In addition to the noted features provide above for multi-layered applications, the second tear-off debris guard 46 preferably comprises a plurality of screen risers 52 substantially situated near the midsection thereof, as depicted in FIG. 6. The screen risers, as illustrated in FIG. 7, functionally serve as means for maintaining separation of the respective protective screen layers insofar to inhibit the accumulation of debris and the like on the underlying protective screen layer while each is fixedly attached to the frontal grill guard. In the preferred embodiment, each screen riser 52 comprises a height of approximately ¼" and an elongate configuration of predetermined length, substantially conforming to the geometry of structural cross members 54 situated in between each of the vent openings 22. As shown in FIG. 5, each screen riser, while each of the tear-off debris guards is installed to the frontal grill guard, preferably rests atop the structural cross members so as to further maintain unobstructed air flow into the engine compartment and mitigate inadvertent movement (e.g., flapping) of each of the tear-off debris guards during all-terrain-vehicle operation.

In operation, the tear-off debris guard is positioned in such a manner that the inner surface 34 is directed toward the exterior surface of the frontal grill guard 20, with each of hook-and-loop fasteners 38 being selectively aligned with one another to mate and secure the tear-off debris guard 10 to the all-terrain-vehicle. In multi-layered applications, a second tear-off debris guard 46 is selectively situated below the first tear-off debris guard and fixedly attached to the frontal grill guard in the same manner described for the first tear-off debris guard. Removal of the tear-off debris guard from the frontal grill guard 20, whether it be the first or second debris guard, is simply accomplished by pulling upwardly on the tear-off tether 16, perpendicular from the frontal grill guard, actions of which collectively result in a clean undersurface for maintaining continuous air flow into the engine compartment.

It can be seen from the foregoing that there is provided in accordance with this invention a simple and easily operated device, which is particularly suitable for use in maintaining continuous air flow into an engine compartment of an all-terrain-vehicle while being operated in harsh environmental conditions. The tear-off debris 10 is completely functional in terms of mitigating the passage of most debris and the like into the operating components dedicated for use in cooling an engine (e.g., radiator). It is obvious that the components comprising the tear-off debris 10 may be fabricated from a variety of materials, providing such selection or use of materials possesses the capacity to remain pliable throughout its duration of use in maintaining continuous air flows. It is most desirable, and therefore preferred, to construct the protective screen 12 from plastic and the frame member 14 from vinyl or equivalent to ensure sustained reliability during use thereof, as hereinbefore stated.

While there has been shown and described a particular embodiment of the invention, it will be obvious to those skilled in the art that various changes and alterations can be made therein without departing from the invention and, therefore, it is aimed in the appended claims to cover all such changes and alterations as fall within the true spirit and scope of the invention.

What is claimed is:

1. A tear-off debris guard for mitigating the passage of debris into an engine compartment of an all-terrain-vehicle having a frontal grill guard integrally equipped with a plurality of vent openings, said tear-off debris guard comprising, in combination:
   at least one protective screen having a geometric configuration proportionally equivalent to the collective area of the vent openings;
   a frame member fixedly attached along the perimeter of said at least one protective screen principally serving as means for reinforcing said at least one protective screen as it is releasably removed from the frontal grill guard;
   a tear-off tether fixedly attached to said frame member principally serving as means for handling and pealing away said frame member from the frontal grill guard; and
   means for attaching said frame member to the frontal grill guard.

2. A tear-off debris guard as set forth in claim 1, wherein said attaching means comprises a plurality of releasable hook-and-loop fasteners fixedly attached to said frame member to correspondingly mate and engage with an equal number of releasable hook-and-loop fasteners configurably attached and arranged in like manner to the frontal grill guard.

3. A tear-off debris guard as set forth in claim 1, wherein said at least one protective screen is fabricated from plastic.

4. A tear-off debris guard as set forth in claim 1, wherein said frame member is fabricated from a flexible, pliable material to permit conformance to the geometric contours of the frontal grill guard.

5. A tear-off debris guard as set forth in claim 4, wherein said flexible, pliable material is vinyl.

6. A tear-off debris guard as set forth in claim 1, wherein said frame member comprises an inner surface for accepting thereon said attaching means comprising a releasable hook-and-loop fastener continuously extending the length of said frame member to correspondingly mate and engage with an equally configured releasable hook-and-loop fastener attached to the frontal grill guard.

7. A tear-off debris guard as set forth in claim 1, wherein said geometric configuration comprises a tapered end and a widened v-shaped end opposite thereof substantially resembling the shape of a shield.

8. A tear-off debris guard as set forth in claim 1, wherein said at least one protective screen comprises a mesh in the range of 8 to 18 openings per linear inch.

9. A tear-off debris guard as set forth in claim 1, wherein said tear-off tether comprises a loop structure for ease in handling and a hook-and-loop fastener attached to the backside thereof and to the frontal grill guard to prevent inadvertent movement thereof during all-terrain-vehicle operation.

10. A tear-off debris guard as set forth in claim 1, wherein said tear-off tether is fixedly attached to an upper portion of said frame member.

11. A tear-off debris guard for mitigating the passage of debris into an engine compartment of an all-terrain-vehicle having a frontal grill guard integrally equipped with a plurality of vent openings, said tear-off debris guard comprising, in combination:
 a first protective screen having a first frame member attached along the periphery thereof and a geometric configuration proportionally equivalent to the collective area of the vent openings;
 a second protective screen having a second frame member attached at the periphery thereof and a geometric configuration to fit within the geometric confines of said first frame member;
 a plurality of screen risers fixedly attached at the midsection of said second protective screen to inhibit the passage and accumulation of debris thereon while being situated below said first protective screen; and
 a plurality of hook-and-loop fasteners fixedly attached to an inner surface of each of said frame members and to the frontal grill guard, substantially along the perimeter of the collective area of the vent openings.

12. A tear-off debris guard as set forth in claim 11, wherein each of said protective screens comprises a mesh size in the range of 8 to 18 openings per linear inch.

13. A tear-off debris guard as set forth in claim 11, said geometric configuration of first protective screen comprises a tapered end and a widened v-shaped end opposite thereof substantially resembling the shape of a shield. debris thereon while situated below said first protective screen.

14. A tear-off debris guard as set forth in claim 11, wherein each of said screen risers comprises an elongate configuration substantially conforming to rest atop structural cross members separating each of the vent openings.

15. A tear-off debris guard as set forth in claim 11, wherein said screen risers collectively establish separation of said first and second protective screens, substantially at the midsection thereof, of approximately ¼ inch.

16. A tear-off debris guard as set forth in claim 11, further comprising a tear-off tether fixedly attached to an upper portion of each of said frame members principally serving as means for handling and pealing away said frame members from the frontal grill guard.

17. A tear-off debris guard as set forth in claim 16, wherein said tear-off tether comprises a loop structure for ease in handling and a hook-and-loop fastener attached to the backside thereof and to the frontal grill guard to prevent inadvertent movement thereof during all-terrain-vehicle operation.

18. A tear-off debris guard as set forth in claim 11, wherein each of said protective screens is fabricated from plastic.

19. A tear-off debris guard as set forth in claim 11, wherein each of said frame members and said screen risers are fabricated from vinyl.

* * * * *